United States Patent [19]

Hendricks

[11] 4,171,586
[45] Oct. 23, 1979

[54] PURSE SEINE HAIRPIN RETAINER

[76] Inventor: Robert T. Hendricks, 11146 - 80 Ave., Delta, British Columbia, Canada

[21] Appl. No.: 877,271

[22] Filed: Feb. 13, 1978

[51] Int. Cl.² ............................................. A01K 75/00
[52] U.S. Cl. ................................................. 43/8; 43/14
[58] Field of Search ............................... 43/8, 14, 6.5

[56] References Cited

U.S. PATENT DOCUMENTS

| | | | |
|---|---|---|---|
| 1,390,006 | 9/1921 | Akre | 43/8 |
| 3,535,811 | 10/1970 | Demmert | 43/8 |
| 3,626,625 | 12/1971 | Whaley | 43/8 |
| 3,638,345 | 2/1972 | Whaley | 43/8 |
| 3,710,498 | 1/1973 | Jangaard | 43/8 |

FOREIGN PATENT DOCUMENTS 164030  7/1958  Sweden ....................................... 43/8

Primary Examiner—Nicholas P. Godici
Attorney, Agent, or Firm—Carver and Company

[57] ABSTRACT

A purse seine hairpin retainer and purse ring handling method which simplifies and lessens the danger involved in collecting and securing the purse rings that are attached to the base of a fish net used in a seining operation for catching fish. The purse rings are threaded by a purse line which is hauled in toward the boat thereby gathering the purse rings together in a closely grouped arrangement and closing the bottom of the net. The purse rings are then threaded onto the lower leg of a hairpin member which is generally hauled up and temporarily suspended over the deck of the boat while upper end of the net is hauled in and the fish removed therefrom. To prevent sudden and potentially dangerous movement of the hairpin member caused by the slipping off of rings or by the pitching movement of the boat a hairpin retainer is disclosed which attaches to the gunwale of the boat by means of a clip formed along its lower edge and has two elongated channel elements along its upper edge which overlap and retain the hairpin member when the latter is hoisted into engagement with the channel elements.

5 Claims, 2 Drawing Figures

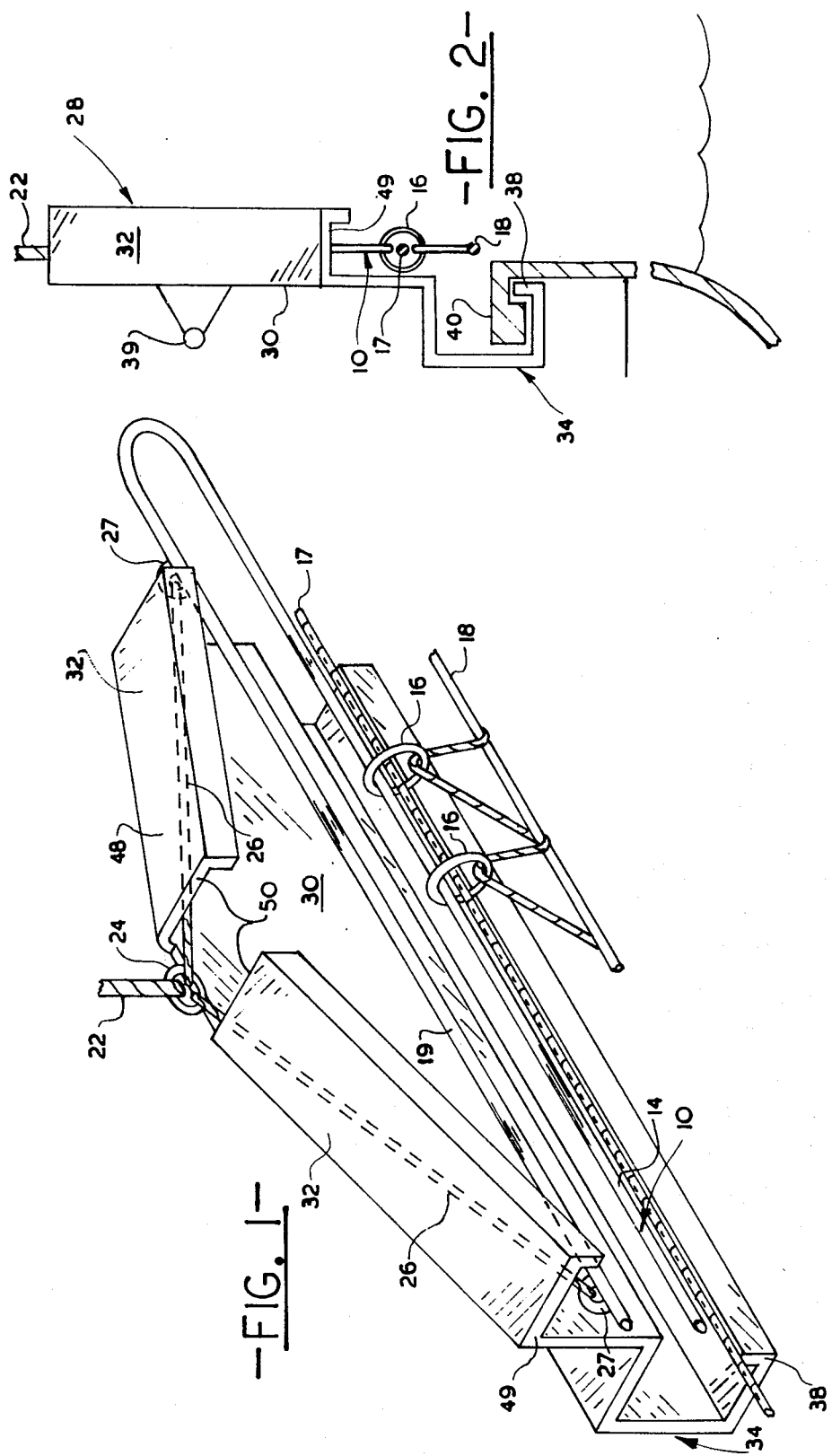

PURSE SEINE HAIRPIN RETAINER

BACKGROUND OF THE INVENTION

1. Field of the Invention

The present invention relates to a purse seine hairpin retainer and purse ring handling method for the recovery of a purse seine loaded with a fish catch.

2. Prior Art

The procedure conventionally used in purse seine operations is to lower a net into the water in a loop around the school of fish. Floats attached to the top of the net keep it from sinking while weights attached to the lower edge of the net hold it substantially vertical in the water so that the net extends to a depth of typically 50 fathoms. Attached along the bottom of the net at regular intervals by means of chain bridles are a plurality of purse rings which, in turn, are threaded by a purse line so that when the seine has been looped around a school of fish the bottom of the net may be closed and the fish thus trapped by hauling in the purse line to draw the rings close together. Traditionally the purse rings are pulled onto the deck of the boat, where they are collected, arranged in order and sometimes tied together in groups so as to avoid the possibility of the net opening. A wet deck coupled with continuous movement of the boat makes this a difficult, physically demanding task.

One method disclosed in the prior art designed to overcome the manual arranging of purse rings employs a substantially horizontal ring holding finger that is affixed at one end by means of a post affixed to the deck of the boat. One end of the purse line is threaded through the finger and when the net is hauled in the rings are threaded onto the finger (Akre, U.S. Pat. No. 1,390,006, Sept. 6, 1921). In order to reduce the likelihood of rings slipping off after being threaded onto the finger a second technique employed a U shaped or substantially straight but upwardly inclined bar member mounted on the side of the boat at the location where the pursing line is normally hauled in (Whaley, U.S. Pat. No. 3,481,065, Dec. 2, 1969). A variation of the latter technique is to make the bar member or finger mounted on the side of the boat adjustable from a substantially horizontal position for drum seining in which the rings are fed off to the drum in the stern of the boat to an angularly upwardly extending position in which the net is pursed and the rings gathered in the usual way (Whaley, U.S. Pat. No. 3,638,345, Feb. 1, 1972). Another technique used in the prior art which avoids the need to hoist the purse rings high above the upper end of the finger in order to thread the rings onto the finger utilizes a purse ring stripper onto which the rings may be threaded at or even below water level (Jangaard, U.S. Pat. No. 3,710,498, Jan. 16, 1973). Although the latter technique avoids the heavy tackle required to raise to a considerable height the purse rings prior to threading them onto a prong or finger, it is susceptible to somewhat erractic movement during the incumbent danger of some of the rings slipping off or alternatively the causing of damage to personnel or to the boat itself.

SUMMARY OF THE INVENTION

Utilized with the present invention is a hairpin member adjustably supported by suspension means which can be lowered to or below water level to threadably receive the purse rings and then hoisted over the deck of the boat where a hairpin retainer designed to fit over the hairpin and a portion of the hairpin suspension means can be affixed to the boat and, in conjunction with a hoisting means raise the hairpin assembly against the frame and thereby prevent upwards or sideways movement of the hairpin member. According to the present invention the hairpin retainer is comprised of a rigid frame. Along the upper edge of the frame are a pair of spaced channel elements having lower outer portions spaced apart a distance approximately equal to the length of either of two suspension lines which are attached at their upper end to a single hoisting line and at their lower end to the upper leg of the hairpin in the vicinity of the ends thereof. The channel elements overlap and retain the upper leg of the hairpin in the vicinity of the points of attachment of the suspension lines when the hoisting line raises the hairpin into engagement with the channel elements. The hairpin retainer also has means for attachment to the boat. The latter apparatus and method allow the threading of the purse rings to be accomplished at or below water level where the buoyant effect of the water facilitates the threading procedure and subsequently enable the loaded hairpin member to be locked into a fixed position with respect to the boat, thereby reducing the possibility of injury from erractic swinging of freely suspended members and accidental slippage of the purse rings off of the hairpin member. Thus, the present method is simple, rapid, safe and easily adapted for use on purse seining vessels without substantial modifications to such vessels.

DESCRIPTION OF THE DRAWINGS

FIG. 1 is a perspective view of the suspended hairpin member loaded with purse rings and hairpin retainer, FIG. 2 is an elevation view of the member structure affixed to the deck of the boat.

DETAILED DISCLOSURE

Illustrated in FIG. 1 is a hairpin member 10 of conventional configuration and construction having a lower leg 14 for receiving purse line rings, a few such rings 16 and associated purse line 17 and lead line 18 being shown representatively, and an upper leg 19 for suspension of the hairpin member 10. The hairpin member is supported by two lines 26 attached at their upper ends to an eye 24 formed in the lower end of a hoisting line 22. The lower ends of the two lines 26 are attached to suspension eyes 27 integral with and along the upper leg 19 of the hairpin 10 disposed substantially equidistantly from the vertical projection of the hoisting line 22 in the vicinity of the ends of the hairpin 10. The two suspension eyes 27 are located such that the lines 26 are substantially of equal length and suspend the hairpin 10 in a horizontal orientation.

A hairpin retainer generally indicated as 28 is provided for the hairpin 10 and comprises a triangular base plate 30, which is bent along a pair of adjacent sides to provide C-shaped bracket elements 32. The lower edge of the base plate is bent (see FIG. 2) to form a hooking bracket 34 terminating in a lip 38. The base plate is also provided with a handle 39 to enable hooking ease. The retainer in use is held in an upright position by the handle with the hooking bracket 34 engaged under the gunwale 40 of the boat (see FIG. 2). Obviously, alternative means for mounting the retainer 28 on the side of the fishing boat for which it is intended could be devised. Indeed, where room is available the retainer could have a hinged connection to the gunwale to allow it to be swung from an operative position when required. The significant feature of the retainer 28, as will be described is that it prevents pivoting movements of the hairpin 10 in response to any accidental release of purse line rings 16 from the lower leg 14 of the hairpin 10. It can be seen from FIG. 1 that the C brackets 32 are formed as inclined receptacles for the lines 26, the receptacles having the same angle of inclination as the lines 26 so as to avoid any stress point between the upper walls of the C brackets and the lines 26. The lower extremities of the C brackets 32 are spaced apart by a distance which is slightly greater than the distance between the mounting eyes 27 on hairpin 10, so that the hairpin 10, when hoisted upwards by the hoisting line 22, fits snugly and securely into place within the retainer 28 and such that the upper walls 48 of the C brackets 32 contact the upper leg 19 of the hairpin 10. In FIG. 1 the hairpin 10 is shown positioned just below its retained position. If the hoisting line 22 were moved vertically upwards slightly it can be seen that the end portions 49 of outer walls 48 of the C brackets 32 would overlap the upper leg of hairpin 10, thus restraining it from any gross movement.

It will be noted that the upper extremities 50 of the C brackets 32 are spaced apart from one another so as to permit the hoisting line 22 to pass freely therebetween.

In use of the retainer in a pursing operation, the purse line is reeled in thus closing the net, the purse rings being gathered into a close compact mass strung on the purse line. The purse line is then tensioned to lift the purse rings out of the water and the lower leg of the hairpin is then threaded through the gathered purse rings. The retainer is then secured to the gunwhale of the boat with the hoisting line 22 passing between the C brackets 32. The hairpin is then hoisted by the hoisting line 22 until the upper leg of the hairpin engages the lower ends of the C brackets. The hoisting line is then further tensioned to apply pressure of the retainer against the gunwhale so as to restrain the hairpin against lateral and swinging movement relative to the boat.

The purse line can then be slackened off and the net then reeled in, the purse line following with the purse rings being stripped one after the other, off the hairpin and onto the reeling drum. It is, during this latter operation, that accidents might frequently occur as due to the sliding of the purse rings off the hairpin the hairpin is over balanced towards its open end, resulting sometimes in all of the purse rings suddenly sliding off and resulting in gross upward and jumping movement of the hairpin. The use of the retainer, it is seen, avoids this. The hairpin may be over-balanced when the purse rings are stripped, however, the hairpin cannot tilt as it is held firmly in position against the retainer so that no movement will occur. When all the purse rings are stripped of the hairpin the hoisting line 22 can be slackened off and the retainer then removed from the gunwhale.

Various alternative methods of constructing the hairpin retainer are possible without departing from the spirit of the invention disclosed herewith. For example, four C brackets, two constructed to fit over the ends of the upper leg of the hairpin 10 adjacent to the suspension eyes 27 and two at a higher elevation to serve as guides for the hoisting line 22, might reasonably be substituted for the elongated channels of the present invention.

I claim:

1. For use with a hoistable hairpin having an upper leg in the vicinity of the ends of which are mounted suspension lines of substantially the same length for attachment to a single hoisting line, and a lower leg for receiving purse rings of a purse seine; a hairpin retainer for mounting to a boat, comprising:
    (a) a rigid frame,
    (b) a pair of sloped spaced channel elements on the frame engageable with the hairpin and having lower outer portions spaced apart a distance approximately equal to the length of either of the suspension lines, said portions overlapping and retaining the upper leg of the hairpin in the vicinity of the points of attachment of the suspension lines when the hoisting line raises the hairpin into engagement with the channel elements,
    (c) means for attaching the frame to the boat.

2. A retainer as defined in claim 1, wherein the channel elements are elongated and inclined at substantially the same angle to the horizontal and with the same orientation as the suspension lines.

3. A retainer as defined in claim 2, wherein the inner upper extremities of the channel elements are spaced apart from one another thereby to form a guideway.

4. A retainer as defined in claim 1, wherein said means for attaching the frame to the boat include a hooking bracket engageable with the gunwale of a boat.

5. For use with a hoistable hairpin having an upper leg in the vicinity of the ends of which are mounted suspension lines of substantially the same length for attachment to a single hoisting line, and a lower leg for receiving purse rings of a purse seine; a hairpin retainer for mounting to a boat, comprising:
    (a) a rigid frame having its upper periphery formed into two elongated channel elements of substantially the same slope and orientation as the suspension lines said channel elements overlapping and retaining the upper leg of the hairpin in the vicinity of the point of attachment of the suspension lines with the hairpin when the latter is raised into engagement with the channel elements,
    (b) a bracket formed along the bottom edge of said frame for engaging the gunwale of a boat.

* * * * *